United States Patent
Hoej et al.

(10) Patent No.: US 9,982,132 B2
(45) Date of Patent: May 29, 2018

(54) ALLOY COMPRISING POLYOLEFIN AND THERMOPLASTIC POLYURETHANE

(71) Applicants: Lubrizol Advanced Materials, Inc., Cleveland, OH (US); Coloplast A/S, Humlebaek (DK)

(72) Inventors: Carsten Hoej, Slangerup (DK); Niels Joergen Madsen, Alleroed (DK); Umit G. Makal, Stow, OH (US)

(73) Assignee: Coloplast A/S, Humblebaek (DE)

( * ) Notice: Subject to any disclaimer, the term of this patent is extended or adjusted under 35 U.S.C. 154(b) by 0 days. days.

(21) Appl. No.: 14/402,511

(22) PCT Filed: May 17, 2013

(86) PCT No.: PCT/US2013/041544
§ 371 (c)(1),
(2) Date: Nov. 20, 2014

(87) PCT Pub. No.: WO2013/176978
PCT Pub. Date: Nov. 28, 2013

(65) Prior Publication Data
US 2015/0141567 A1 May 21, 2015

(30) Foreign Application Priority Data

May 21, 2012 (DK) .................. 2012 70267
Jun. 14, 2012 (DK) .................. 2012 70328

(51) Int. Cl.
*C08L 75/04* (2006.01)
*C08G 18/48* (2006.01)
(Continued)

(52) U.S. Cl.
CPC ............. *C08L 75/04* (2013.01); *C08G 18/10* (2013.01); *C08G 18/48* (2013.01);
(Continued)

(58) Field of Classification Search
CPC ............................. C08L 75/04; C08G 18/48
See application file for complete search history.

(56) References Cited

U.S. PATENT DOCUMENTS 3,264,272 A * 8/1966 Rees ................. B32B 17/10743
156/332
4,410,595 A * 10/1983 Matsumoto ............ C08L 75/04
428/412

(Continued)

FOREIGN PATENT DOCUMENTS

CN 1871291 A 11/2006
EP 0347794 12/1989
(Continued)

*Primary Examiner* — Arrie L Reuther
(74) *Attorney, Agent, or Firm* — Coloplast Corp., Coloplast A/S; Nick Baumann

(57) ABSTRACT

This invention relates to an alloy comprising polyurethane and polyolefin. It has now surprisingly been found that a specific composition of polyolefin and polyurethane has surprising mechanical properties and at the same time has transparent characteristics and/or appearance. The present invention provides an alloy with remarkable mechanical properties. The phases do not macro-phase separate. Thus, this stable and potentially broad interface is very effective in stress transfer when the alloy is strained. As one might expect, the hardness values for the alloys are in between the hardness values of each component but the other physical properties are no adjusted. In this way, when considering the hardness and mechanical values, these alloys behave like two compatible polymers.

15 Claims, 8 Drawing Sheets

(51) Int. Cl.
  *C08G 18/76* (2006.01)
  *C08G 18/10* (2006.01)
  *C08L 75/08* (2006.01)
  *C08L 23/06* (2006.01)
  *C08L 23/12* (2006.01)

(52) U.S. Cl.
  CPC ......... *C08G 18/4854* (2013.01); *C08G 18/76* (2013.01); *C08L 23/06* (2013.01); *C08L 23/12* (2013.01); *C08L 75/08* (2013.01)

(56) References Cited

U.S. PATENT DOCUMENTS

| | | | | |
|---|---|---|---|---|
| 4,883,837 A | * | 11/1989 | Zabrocki | C08L 23/02 525/125 |
| 6,072,003 A | * | 6/2000 | Horrion | C08F 255/00 525/88 |
| 2005/0070665 A1 | * | 3/2005 | Ludlow, III | C08L 23/0823 525/131 |
| 2008/0085988 A1 | * | 4/2008 | Siddhamalli | C08G 18/02 528/85 |
| 2010/0160545 A1 | * | 6/2010 | Page | C08G 18/4277 524/589 |

FOREIGN PATENT DOCUMENTS

| | | |
|---|---|---|
| EP | 0353673 | 2/1990 |
| EP | 0353673 A1 | 2/1990 |
| RU | 2141492 C1 | 11/1999 |
| WO | 09076768 | 6/2009 |
| WO | 2011159435 A1 | 12/2011 |

* cited by examiner

ALLOY COMPRISING POLYOLEFIN AND THERMOPLASTIC POLYURETHANE

FIELD OF THE INVENTION

This invention relates to an alloy comprising polyurethane and polyolefin.

BACKGROUND OF THE INVENTION

Thermoplastic polyurethanes (TPU) are fundamentally the reaction products of polyisocyanates and hydroxyl terminated intermediate, for example, diols, and in some embodiments, long-chain diols. They comprise a broad family of compositions having both urethane segments and non-urethane segments. Thermoplastic polyurethanes generally have no, or only very slight, crosslinking and accordingly have a linear structure. Thermoplastic polyurethanes are well known to the person skilled in the art and are described by way of example in Kunststoff-Handbuch [Plastics handbook], Volume 7, Polyurethane, ed. G. Oertel, 2nd edn., Carl Hanser Verlag, Munich, 1983, particularly on pages 428, 473. Some thermoplastic polyurethanes, and their preparation, are disclosed in U.S. Pat. Nos. 4,542,170 and 4,397,974. U.S. Pat. No. 4,397,974 discloses preparation of thermoplastic polyurethane elastomers by reacting a long-chain polyol having molecular weight in the range of about 400 to 10,000, preferably 800 to 6,000; with a polyisocyanate, preferably a diisocyanate; and a chain extender having a molecular weight of up to about 400. The preferred chain extenders are short-chain polyols having molecular weight of up to 380. The equivalent ratio of isocyanate groups to the active hydrogen atoms, or the NCO/OH ratio, is in the range of 0.90 to 1.10, preferably in the range of 0.98 to 1.04.

Thermoplastic polyurethanes are often used in blends with other materials, including polyolefins. However it is often difficult to achieve a blend of thermoplastic polyurethanes and other materials, including polyolefins, that retain all of the physical properties desired for the blend.

U.S. Pat. No. 4,883,837 describes a thermoplastic compatible blended composition comprising a. from 15 to 60 weight percent of a polyolefin, b. from about 30 to 70 weight percent of a thermoplastic polyurethane and c. from about 10 to 35 weight percent of a least one modified polyolefin defined as a random, block or graft olefin copolymer having functional groups selected from the class consisting of carboxylic acid, carboxylate ester, carboxylic acid anhydride, carboxylate salts, amide, epoxy, hydroxyl and acyloxy. The blends are described as soft, flexible compositions having high tensile and tear strength with good processability and good adhesion to a wide variety of plastics. Applications include fabric coatings for upholstery, rainwear and sportswear and for production of surgical gloves, plastic laminating and the like.

EP 0353673 A1 describes blends of a thermoplastic polyurethane elastomer and a carbonyl modified polyolefin with improved properties such as impact resistance, low temperature toughness, low melt processing temperatures, generally increased flex modulus and improves flex strength. The amount of carbonyl modified polyolefin is generally about 1 part to about 30 parts by weight for every 100 parts by weight of the thermoplastic polyurethane elastomer. The blends can be used to produce heat molded products for automotive applications.

EP 2279767 A2 describes a medical device, in particular a urinary catheter, comprising a substrate, having on its surface a hydrophilic surface layer providing a low friction surface when wetted by a wetting fluid. The substrate is made of a polymer blend comprising a polyolefin and a composition having molecules with active hydrogens, such as polyamide or polyurethane. The preferred blend comprises at least 80 weight percent polyolefin and therein possibly intermixed medical oil and/or paraffin, and 2-20 weight percent of the component having molecules with active hydrogens. This composition is described as environmentally acceptable and cost effective, has adequate mechanical and chemical properties, and enables the hydrophilic coating to be adequately adhered.

UK Patent Application No. GB 2048903 describes a thermoplastic resinous composition consisting essentially of 5 to 70 weight percent of a thermoplastic polyurethane elastomer and 30 to 95 weight percent of a modified polyolefin or an olefin copolymer, having functional groups of at least one type selected from carboxyl, carboxylate salt, carboxylic anhydride, amide, hydroxyl and epoxy groups. An application of the thermoplastic resinous composition is a laminate having at least two layers bonded to each other, at least one of the layers being comprised of the above-mentioned resinous composition.

SUMMARY OF THE INVENTION

It has now surprisingly been found that a specific composition of polyolefin and polyurethane has surprising mechanical properties and at the same time has transparent characteristics and/or appearance.

Our data show, that compounding TPU A or TPU E with a range of Polyolefins (PO) results in an alloy with remarkable mechanical properties. The phases do not macro-phase separate. Thus, this stable and potentially broad interface is very effective in stress transfer when the alloy is strained. As one might expect, the hardness values for the alloys are in between the hardness values of each component but the other physical properties are no so adjusted. In this way, when considering the hardness and mechanical values, these alloys behave like two compatible polymers.

DETAILED DESCRIPTION OF THE PRESENT INVENTION

Thus, one aspect of the invention relates to an alloy of a thermoplastic polyurethane (TPU) and a Polyolefin (PO) having at least one of the following properties:
the ratio between the surface tension of the TPU and the surface tension of the PO measured above the melt temperature of the alloy is between 0.5 to 1.5;
the PO contains at least one functional group that can form long range interactions with one or more segments of the TPU;
the viscosity of the discrete phase over the viscosity of the matrix phase is below 2 under processing conditions.

The compositions of the invention include a thermoplastic polyurethane (TPU) component and a polyolefin (PO). The composition may be described as an alloy of a TPU and PO, or as a blend of a TPU and PO.

The compositions of the invention include a thermoplastic polyurethane (TPU) component. Such TPU are made by reacting a polyisocyanate with at least one diol chain extender, and optionally one or more hydroxyl terminated intermediates.

In one aspect, the hydroxyl terminated intermediates include a polyester polyol, which are made by the polycondensation of multifunctional carboxylic acids and hydroxyl compounds. These are also referred to as polyester TPU.

In another aspect, the hydroxyl terminated intermediates include a polyether polyol, which are made by the reaction of epoxides (oxiranes) with an active hydrogen containing starter compounds. These are also referred to as polyether TPU. In general, polyether TPU has a lower surface tension than polyester TPU. As PO typically has surface tensions comparable to polyether TPU finding a matching PO to a polyether TPU is easier.

Polyolefins are well known and commercially available materials. Polyolefins may be described as polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins can be prepared by various well known methods, including but not limited to: radical polymerization (normally under high pressure and temperature); and (b) catalytic polymerization using a catalyst that normally contains one or more than one metal of groups IVb, Vb, VIb or VIII of the Periodic Table.

Polyolefins, as used herein, also includes mixtures of one or more of the polyolefins described above. For example, in some embodiments the polyolefins used in the invention are mixtures of polypropylene with polyisobutylene, polypropylene with polyethylene (for example PP/HDPE, PP/LDPE) and mixtures of different types of polyethylene (for example LDPE/HDPE).

Polyolefins, as used herein, also includes copolymers of monoolefins and diolefins with each other or with other vinyl monomers, preferably aliphatic vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with any of the polyolefins described above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EAA and alternating or random polyalkylene/carbon monoxide copolymers and mixtures thereof with other polymers, for example polyamides.

Additional polyolefins also suitable for use in the present invention include "linear low density polyethylenes" (LLDPE) which are prepared using a coordination catalyst, but which, because of the presence of minor amounts of copolymerized higher olefins (especially olefins of 4 10 carbon atoms) have a density lower than HDPE, yet the arrangement of polymerized molecular units is of the linear type.

It is also contemplated to use polyolefins, such as ethylene polymers, which contain other comonomers, such as acrylic acid, methacrylic acid, alkyl acrylates, vinyl esters, and carbon monoxide. These type of monomers, which contain oxygen atoms, are employed using a free-radical initiator, but are not very well suitable when coordination catalysts are employed. The coordination catalysts, which generally contain metal-carbon bonds, are usually poisoned or deactivated by compounds containing oxygen-carbon bonds or hydrogen-oxygen bonds when employed in quantities such as are involved in copolymerization thereof. On the other hand, copolymerization of ethylene with the higher hydrocarbon olefins is best done using a coordination type catalyst. In some embodiments the PO may include units derived from an oxygen-containing comonomer, for example acrylic acid, such that the PO is at least 4, 6, 9, or even 11 percent by weight comonomer. In some embodiments the PO has a comonomer content of 4 to 11 percent by weight, or even 6 to 11 or 9 to 11 percent by weight. In some embodiments the oxygen-containing comonomer is acrylic acid.

In one embodiment, the PO is selected from the group of polyethylene (PE), polypropylene (PP), copolymer of polyethylene, and copolymer of polypropylene, including a PE and/or PP containing comonomers such as acrylic acid, methacrylic acid, alkyl acrylates, vinyl esters, and/or carbon monoxide.

In some embodiments the compositions of the invention have reduced interfacial tension, in other words the difference between the surface tension of TPU and the surface tension of the PO at the process temperature is small. While not wishing to be bound by theory, it is believed that a sufficiently low interfacial tension is an important variable for ensuring the compositions of the invention to have the desirable properties described herein, most likely because the low interfacial tension is required to allow a stable interface to form between the TPU and PO components of the blend. Surface tension may be measured by various means, including but not limited to the drop volume method, the Du Noüy Ring method, the Du Noüy-Padday method, the Wilhelmy plate method, the spinning drop method, the pendant drop method, the bubble pressure method, the capillary rise method, the stalagmometric method, and the sessile drop method.

A convenient way to describe the interfacial tension of the compositions of the invention is to refer to the ratio of the surface tension of the TPU and the surface tension of the PO at the process temperature. The closer the ratio is to 1, the lower the interfacial tension of the composition. In some embodiments the ratio of the surface tension of the TPU and the surface tension of the PO is from 0.5 to 1.5, or even from 0.8 to 1.2, or even from 0.9 to 1.1, or even about 1.0.

When referring to the process temperature in the above discussion of surface tension, we refer to the compounding conditions described herein. In one embodiment that could be at 2° C. above the melt temperature of the alloy.

In one embodiment the surface tension ratio is determined by the steps of:
  run a DSC of the alloy to determine the melt temperature of the alloy;
  selectively separate the components of the alloy, for example by solvent extraction;
  determine the surface tension of each component by the modified Wilhelmy balance technique
  obtain the ratio by dividing the surface tension of the TPU with the surface tension of the PO.

To form an alloy of the invention, starting with a particular PO, the surface tension of a TPU needs to be adjusted to get a ratio as just described. One such adjustment method is to vary the ratio between hard segment (HS) and soft segments (SS) of the TPU. The HS are generally polar, high melting segments formed from the isocyanate and chain extenders. The SS are generally less polar, low melting segments formed from high molecular weight polyols. The ratio between these two can be determined by NMR.

To decrease the surface tension of the TPU, it has proven advantageous to increase the SS content of the TPU. Likewise, the higher the HS content, the higher the surface tension.

If the ratio between the HS and SS is held constant, the surface tension can be altered by adjusting the composition of the SS. That is, by increasing the Mn of the poly THF used to form the SS, the surface tension of the resulting TPU may be decreased.

In general, the surface tension of the TPU is higher than the surface tension of the PO to be compounded with the TPU. Thus, typically the surface tension of the TPU should be lowered. The Mn of the polyether poyol used in the preparation of TPU A is 2000 g/mol, and the Mn of the polyether polyol used in the preparation of TPU E is 1,400 g/mol. In contrast thereto, the Mn of the polyether polyol used in the preparation of TPU B and TPU D is 1,000 g/mol. It is therefore preferred, that the Mn of the polyether polyol is higher than 1,000 g/mol, or in some embodiments at least 1,400 g/mol.

To form an alloy of the invention, starting with a particular TPU, the surface tension of a PO needs to be adjusted to get a ratio as just described. One method of increasing the surface tension of the PO is to co-polymerize and/or graft acrylic acid on the PO.

In some embodiments the PO present in the compositions of the invention have at least one functional group that allows for long range interactions with one or more segments of the TPU present in the compositions of the invention. While not wishing to be bound by theory, it is believed that a certain amount of long range interaction is an important variable for ensuring the compositions of the invention have the desirable properties described herein, most likely because the long range interactions are required to allow the interface between the TPU and PO components of the blend, once formed, to stabilize. Long range interactions that may be useful in the invention include ionic bonding, hydrogen bonding, and van der Waals interactions. In some embodiments the long range interactions are not covalent bonds. In some embodiments the long range interactions include hydrogen bonding.

Functional groups that can give rise to long range interactions with segments of the TPU component, for example hydrogen bonding to one or more segments of the TPU component, include functional groups with a hydrogen atom covalently bonded to an electronegative, such as an oxygen or nitrogen, atom. Carboxylate groups and maleic acid derived groups are examples of functional groups that can make hydrogen bond to one or more segments of the TPU component. Care must be taken, when using PO components having such functional groups, or when adding such functional groups to a PO, to minimize any increase in interfacial tension of the overall composition. Ideally the functional groups being used and/or added to the PO would be carefully selected to not only allow for hydrogen bonding to one or more segments of the TPU component, but also to minimize any increase in interfacial tension of the overall composition, and further to even reduce the interfacial tension of the overall composition. In some embodiments, using acrylate (acrylic acid) groups in the PO accomplishes this goal.

In some embodiments the viscosity of the TPU and the PO are similar. It is presently believed that similar viscosities helps to form a good interface between the TPU and PO components of the blend.

A convenient way to describe the similarity of the viscosities of the components is to refer to the ratio ($\lambda$) of the discrete phase of the composition over the matrix phase of the composition:

$$\lambda = \frac{\eta_d}{\eta_c}$$

where $\eta_c$ is the viscosity of the continues phase and $\eta_d$ is the viscosity of the disperse phase.

The closer the ratio is to 1, the more similar the viscosities are. As changes in viscosity are logarithmic it is preferred that the viscosity ratio is between 10 and 0.1 such as between 3 and 0.3.

It is preferred, that the discrete phase is the PO phase, and the matrix phase is the TPU phase. Thus, an embodiment relates to an alloy wherein the viscosity of the PO over the viscosity of the TPU is between 10 and 0.1 under processing conditions.

As illustrated for example in Example 3, processing conditions can be a range of temperatures and pressures. This range is allowed, inter alia if the compositions of the alloy have similar viscosity profiles (as illustrated in Example 8), and more specifically, similar viscosity profiles under various shear rates and temperatures. In other words the viscosities of the TPU component and the PO component are similar across the ranges of processing conditions the composition will experience during blending, especially shear rates. This offers a large window of processing conditions suitable for forming the alloy.

The Weber number (We) is often used to characterize the dispersion of droplets:

$$We = \frac{\dot{\gamma} \cdot d_0 \cdot \eta_c}{2 \cdot \sigma_{II}}$$

where $d_0$ is the droplet diameter before break-up, $\eta_c$ is the viscosity of the continues phase, $\sigma_{II}$ is the surface tension of the continues phase and $\dot{\gamma}$ is the shear.

The Weber number is a measure of the ratio between the forces acting to deform the droplet (shear, viscosity of the continuous phase) and the forces holding the droplet together (surface tension).

If a pair of PU and PO is not miscible, changing the processing conditions can contribute to making it happen. For example, increasing the shear ($\dot{\gamma}$).

When referring to a viscosity ratio at processing conditions, in some embodiments it is meant that the ratio will have the specified value, or be within the specified range, when the process is up and running at steady state (i.e. start-up or shut down conditions are not relevant). In other embodiments it is useful to specify a specific shear rate and/or temperature, or to otherwise specific the processing conditions meant. In some embodiments the viscosity ratio is considered at a temperature above the melting point of the composition and a shear rate of 500 s$^{-1}$, a shear rate preferred if the alloy is to be injection moulded.

In some embodiments the viscosity ratio is considered at a temperature above the melting point of the composition and a shear rate of 1000 s$^{-1}$, or at a temperature above the melting point of the composition and a shear rate of 3000 s$^{-1}$. In any of these embodiments the temperature may be at least 2 degrees C. above the melting point of the blend, at least 5 degrees C. above the melting point of the blend, or even 2 or 5 degrees C. above the melting point of the blend, and in still further embodiments the temperature may be from 150 to 200, or from 170 to 190, or of about 170, 180, or 190 degrees C. In any of these embodiments the viscosity ratio may be less than 1, less than 0.75, less than 0.5, or even less than 0.4, while being at last 0.1.

To form an alloy of the invention, starting with a particular TPU, the viscosity of the PO can be modified to match the viscosity of the TPU by altering the molecular weight of the PO. Increasing the molecular weight of the PO will increase the viscosity of the PO, and, likewise, decreasing the molecular weight of the PO will decrease the viscosity of the PO.

To form an alloy of the invention starting from a particular PO, the viscosity of the TPU can be modified by the molecular weight of the TPU (as stated above for PO). However, we have found that that TPU is more shear dependent than the PO. Thus, by increasing shear rate in the processing conditions the viscosity of the TPU is decreased relatively more than the viscosity of the PO.

We have also found that by increased processing temperature, the viscosity of the TPU decreases more than the viscosity of the PO. Thus, by increasing the processing temperature the viscosity of the TPU is decreased relatively more than the viscosity of the PO. Accordingly, a matching viscosity at processing conditions can be found.

As presented in the foregoing, various variable has to be adjusted in order to form the miscible blend, the alloy, of the invention. In one aspect of the invention, those variables are adjusted by adding a third component to the mixture: e.g. a plasticizer. It is presently anticipated that plasticizers have the effect that they lower the surface tension and the viscosity of the TPU. The plasticizer has a dual role; (1) it decreases the viscosity which helps to stabilize the interface by decreasing the droplet diameter; (2) It helps to decrease the interfacial tension.

In one aspect the plasticizers comprises hydrophobic butyl groups.

In a related aspect, the plasticizer is Citrofol.

One aspect of the invention relates to the pure mixture of a PO and a TPU as described. That is, the alloy consists essentially of TPU and PO.

In some embodiments, and more specifically embodiments where the compositions of the invention are clear and/or have a reduced level of haze, the compositions of the invention include TPU and PO components that have similar refractive indices. While not wishing to be bound by theory, it is believed that similar refractive indices are necessary for the resulting composition to be clear. The refractive index of a material can be measured with refractometers. They generally measure some angle of refraction or the critical angle for total internal reflection for a liquid or solid material.

A convenient way to describe the similarity of the refractive index of the TPU component and the refractive index of the PO component included in the compositions of the invention is to refer to the ratio of the refractive index of the TPU component to the refractive index of the PO component, as measured at room temperature. The closer the ratio is to 1, the more similar the refractive indices are. In some embodiments the ratio of the refractive index of the TPU component to the refractive index of the PO component is from 0.8 to 1.2, or from 0.9 to 1.1, or from 0.95 to 1.05, such as from 0.96 to 1.04 or from 0.97 to 1.03 or from 0.98 to 1.02, or even from 0.99 to 1.01 or even from 1.0 to 1.01. In some embodiments the ratio of the refractive index of the TPU component to the refractive index of the PO component is less than 1.1, or less than 1.02 or even less than 1.01. In some of these embodiments room temperature may be considered to be about 20 degrees C.

Thus, one interesting option with the alloys of the invention is the formation of alloys wherein
    the ratio between the refractive index of the TPU and the refractive index of the PO is between 0.9 and 1.1 and in some embodiments is between (0.99 and 1.01, or even 0.995 and 1.005); and
    the Haze value for both the TPU and the PO prior to compounding is below 30.

Typically, the haze value is measured at 555 nm according to ASTM D1003-07 "Standard Test Method for Haze and Luminous Transmittance of Transparent Plastics".

One particular aspect of the invention relates to an alloy of a thermoplastic polyurethane (TPU) and a Polyolefin (PO) having a ratio of refractive index between the TPU and the PO of between 0.9 and 1.1; and the Haze value for both the TPU and the PO is below 30.

On series of embodiments relates to a composition comprising a thermoplastic polyurethane (TPU) and a polyolefin (PO), wherein the TPU comprises the reaction product of a polyisocyanate, (for example a diisocyanate), a chain extender, and an optional polyol, and wherein the TPU has at least one of the following properties:
    (i) a chain extender to polyol molar ratio of at least 1.3;
    (ii) a blend molecular weight (BMW) of at least 500; and
    (iii) a hard segment content of less than 40%.

Suitable polyisocyanates to make the TPU include aromatic diisocyanates such as 4,4"-methylenebis-(phenyl isocyanate) (MDI), m-xylene diisocyanate (XDI), phenylene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4"-diisocyanate (H12MDI).

Mixtures of two or more polyisocyanates may be used. In some embodiments the polyisocyanate is MDI and/or H12MDI. In some embodiments the polyisocyanate may include MDI. In some embodiments the polyisocyanate may include H12MDI.

Suitable chain extenders to make the TPU include relatively small polyhydroxy compounds, for example lower aliphatic or short chain glycols having from 2 up to about 20 or in some cases from 2 up to about 12 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy) phenyl]propane (HEPP) and hydroxyethyl resorcinol (HER), and the like, as well as mixtures thereof. In some embodiments the chain extenders are 1,4-butanediol and 1,6-hexanediol. Other glycols, such as aromatic glycols could be used, but in some embodiments the TPUs of the invention are not made using such materials.

In some embodiments the chain extender used to prepare the TPU is substantially free of, or even completely free of, 1,6-hexanediol. In some embodiments the chain extender used to prepare the TPU includes a cyclic chain extender. Suitable examples include CHDM, HEPP, HER, and combinations thereof. In some embodiments the chain extender used to prepare the TPU includes an aromatic cyclic chain extender, for example HEPP, HER, or a combination thereof.

In some embodiments the chain extender used to prepare the TPU includes an aliphatic cyclic chain extender, for example CHDM. In some embodiments the chain extender used to prepare the TPU is substantially free of, or even completely free of aromatic chain extenders, for example aromatic cyclic chain extenders.

Suitable polyols (hydroxyl terminated intermediates), when present, include one or more hydroxyl terminated polyesters, one or more hydroxyl terminated polyethers, one or more hydroxyl terminated polycarbonates or mixtures thereof.

Suitable hydroxyl terminated polyester intermediates include linear polyesters having a number average molecular weight (Mn) of from about 500 to about 10,000, from about 700 to about 5,000, or from about 700 to about 4,000, and generally have an acid number generally less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred diacid. The glycols which are reacted to form a desirable polyester intermediate can be aliphatic, aromatic, or combinations thereof, including any of the glycol described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

Suitable hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene glycol) comprising water reacted with tetrahydrofuran (PTMEG). In some embodiments the polyether intermediate includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn) as determined by assay of the terminal functional groups which is an average molecular weight greater than about 700, such as from about 700 to about 10,000, from about 1000 to about 5000, or from about 1000 to about 2500. A particular desirable polyether intermediate is a blend of two or more different molecular weight polyethers, such as a blend of 2000 $M_n$ and 1000 $M_n$ PTMEG.

Suitable hydroxyl terminated polycarbonates include those prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, 1,6-hexanediol6, 2,2,4-trimethyl-1,6-hexanediol, 1,10-decanediol, hydrogenated dilinoleylglycol, hydrogenated dioleylglycol; and cycloaliphatic diols such as 1,3-cyclohexanediol, 1,4-dimethylolcyclohexane, 1,4-cyclohexanediol, 1,3-dimethylolcyclohexane, 1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenylcarbonate, ditolylcarbonate, and dinaphthylcarbonate.

In some embodiments the TPU is made by reacting the polyisocyanate shown above with the chain extender, with or without any polyol being present. The reactants to make the rigid TPU may be reacted together in a "one shot"

polymerization process wherein all of the components, including reactants are added together simultaneously or substantially simultaneously to a heated extruder and reacted to form the TPU polymer. The reaction temperature utilizing urethane catalyst are generally from about 175° C. to about 245° C., and in some embodiments from about 180° C. to about 220° C. In some embodiments the equivalent ratio of the diisocyanate to the total equivalents of the hydroxyl terminated intermediate and the diol chain extender is generally from about 0.95 to about 1.05, desirably from about 0.97 to about 1.03, or from about 0.98 to about 1.01.

Any of the TPU described above may also include one or more additives. These additives may be present with the components that react to form the rigid TPU, or these additives may be added to the rigid TPU after it has been prepared. Suitable additives include pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, antimicrobials, and of course any combination thereof.

In some embodiments the TPU includes a TPU made from (i) a diisocyanates that includes 4,4"-methylenebis(phenyl isocyanate) (MDI), m-xylene diisocyanate (XDI), dicyclohexylmethane-4,4"-diisocyanate (H12MDI), or some combination thereof; (ii) a chain extender that includes ethylene glycol, diethylene glycol, propylene glycol, dipropylene glycol, 1,4-butanediol, 1,6-hexanediol, 1,3-butanediol, 1,5-pentanediol, neopentylglycol, or some combination thereof; and (iii) a polyether polyols that includes poly(ethylene glycol) comprising ethylene oxide reacted with ethylene glycol, poly(propylene glycol) comprising propylene oxide reacted with propylene glycol, poly(tetramethylene glycol) comprising water reacted with tetrahydrofuran (PTMEG).

In some embodiments the TPU of the invention has a chain extender to polyol molar ratio, calculated by the dividing the moles of chain extender used in the preparation of the TPU by the moles of polyol used in the preparation of the TPU, of at least 1.3, at least 1.4, or even at least 1.5. In some embodiments the a chain extender to polyol molar ratio is from 1.3 to 2, or from 1.4 to 2, or from 1.3 to 1.8, or from 1.4 to 1.8, or even about 1.5, about 1.6, or about 1.7.

In some embodiments the blend molecular weight (BMW) of the components used to prepare the TPU, which may be determined by hydroxyl analysis, to be at least 500, or at least 600, or even at least 700, and less than 950, or no more than 900, or even no more than 850. In some embodiments the BMW is from 700 to 900, or even from 800 to 900, or from 750 to 850, or from 850 to 950.

In one aspect of the invention, the alloy comprises 30-70 (w/w) % TPU, preferably 40-60 (w/w) % polyurethane.

In a related aspect, the alloy comprises 30-70 (w/w) % polyolefin, preferably 40-60 (w/w) % polyolefin.

One embodiment of the invention relates to a mixture of TPU A with a PO containing acrylic acid such a Nucrel 3990, Nucrel 0903HC, Escor 5000, Escor 5100, and/or Lucalen A3110M.

One embodiment of the invention relates to a mixture of TPU E with a PO containing acrylic acid such a Nucrel 3990, Nucrel 0903HC, Escor 5000, Escor 5100, and/or Lucalen A3110M.

In some embodiments the alloy compositions of the invention may be crosslinked. In these embodiments the TPU used in the alloys of this invention contains some unsaturation in its backbone that is capable of reacting to form crosslinks to produce a thermoset network. This unsaturation may be introduced into the TPU by incorporating glycols that contain carbon-carbon double bonds into the polymer as part of the chain extender or the hydroxyl terminated intermediate may have carbon-carbon double bonds. In some embodiments, both the chain extender (hard segment component) and the hydroxyl terminated intermediate (soft segment component) have double bonds. This allows crosslinking to occur in both the hard and soft segments of the TPU. These glycol chain extenders that contain carbon-carbon double bonds are typically in the form of allyl moieties, such as those present in trimethylolpropane monoallyl ether. Such unsaturation may also be present in the PO component used in the alloys of in the invention, but in some embodiments the hydrocarbon backbones of the PO may be crosslinkable even without any unsaturation present. In any case, when activated (i.e. with E-Beam irradiation), the carbon-carbon double bonds, or other groups available for crosslinking, within the components may react together to produce crosslinks between different polymer chains in the alloy thus producing a crosslinked thermoset. The crosslinking used in curing the alloy can be generated by exposure to electron beam irradiation, gamma rays, ultra-violet light (in the presence of a photo initiator in relatively clear polymeric formulations), or by chemical free radical generators such as aliphatic and aromatic peroxides, azo compounds, photo initiators, etc.

In some embodiments the alloy compositions of the invention may be used as a compatibilizer in a blend of one of more TPU materials and one or more PO materials, including blends of TPU and PO other than those specified above as useful in making the alloys of the invention. In other words, the alloys of the invention, which must be made with specific TPU and PO materials in order to produce the useful alloys described herein, can improve the compatibility of other blends of TPU and PO that would otherwise not mix well and not product a stable and useful composition. In such embodiments the alloys of the present invention may be present in a composition from 0.1 to 10 percent by weight, while the rest of the composition includes one or more TPU materials and one or more PO materials, where at one of the TPU materials or PO materials is different from the TPU or PO material present in the alloy being used as the compatibilizer. In some embodiments the alloy is made of a first TPU and a first PO, as described above, and then is combined with a second TPU and a second PO where (i) the second TPU is different from the first TPU, (ii) the second PO is different from the first PO, or (iii) the second TPU is different from the first TPU and the second PO is different from the first PO. The weight ratio of the second TPU to the second PO is not overly limited and in some embodiments may be from 1:99 to 991 or from 10:90 to 90:10, or from 30:70 to 70:30 or from 40:60 to 60:40. The compatibilized blend may contain one or more additional additives, including any of the additives described above. While not wishing to be bound by theory, it is believed that the compatibilized blend of TPU and PO that uses the alloy of the invention as a compatibilizer, will have better physical properties compared to the blend of the same TPU and PO where the alloy of the invention is not present, and that this is due to the alloy acting to improve the compatibility of the TPU and PO in the blend due to the same forces that cause the TPU and PO of the alloys of the invention to be some compatible. In such embodiments the invention includes compatibilized blends of TPU and PO that uses the alloy of the invention as a compatibilizer, the process of making such blends, as well as the use of the alloy of the invention as a compatibilizer in TPU and PO blends, including the use of the alloy to improve the physical properties of such blends, including the tensile strength, ultimate elongation, clarity/haze, etc. of the blend.

In some embodiments the alloys of the invention include a plasticizer. As noted above, it is believed that a plasticizer may work, in certain instances, to improve the compatibly of a given pairing of TPU and PO, by bringing one or more of the important properties described above of one or both of the components into better alignment with one another. The type of plasticizer used can be any of the known plasticizers for use in TPU. The most common plasticizer types used are phthalates with butyl benzyl phthalate being the most preferred. Plasticizers used in the present invention can include phthalate based plasticizers, such as, di-n-butylphthalate, di-2-ethylhexyl phthalate (DOP), di-noctyl phthalate, diisodecyl phthalate, diisooetyl phthalate, octyldecyl phthalate, butylbenzyl phthalate, and di-2-ethyhexyl phosphate isophthalate; aliphatic esterbased plasticizers, such as di-2-ethylhexyl adipate (DOA), di-n-decyl adipate, diisodecyl adipate, dibutyl sebacate, and di-2-ethylhexyl sebacate; pyrometallitate-based plasticizers, such as trioctyl trimellitate and tridecyl trimellitate; phosphate-based plasticizers, such as tributyl phosphate, tri-2-ethylhexyl phosphate, 2-ethylhexyldiphenyl phosphate, and trieresyl phosphate; epoxy-based plasticizers, such as epoxy-based soybean oil; and polyesterbased polymer plasticizers. For applications that are sensitive from the toxicological point of view, such as children's toys and food contact, di-isononyleyelohexane-1,2-dicarboxylate (Hexamoll® DINCH from BASF) may be used as the plasticizer. A single plasticizer may be used or a combination of two or more plasticizers may be used. The selection of the desired plasticizer or combination of plasticizers will depend on the TPU and PO components being used in the alloy, the end use application in mind for the composition, and various other factors well understood by those skilled in the art of formulating such materials. The amount of plasticizer used, if present, may be from 0.1 to 30.0 percent by weight of the overall composition or even from 5.0 to 20.0 percent by weight of the overall composition. In such embodiments the invention includes alloys of TPU and PO where a plasticizer is used to result in an improved blend (the plasticizer resulted in the components being better matched to one another as described above, resulting in an improved blend compared to the blend that would have resulted without the plasticizer), the process of making such alloys with the help of a plasticizer, as well as the use of the plasticizer in the alloy to improve the compatibility of the TPU and PO components, including the use of the plasticizer to improve the physical properties of the resulting alloy, including the tensile strength, ultimate elongation, clarity/haze, etc. of the alloy.

In some embodiments the alloys of the invention are essentially free of any plasticizer, or even completely free of any plasticizer, and still obtain the improved compatibility described above.

The blends of the invention may be used in various applications, including medical devices. Medical devices benefiting from the present invention include a variety of implantable or insertable medical devices, which are implanted or inserted into a subject, for example, for procedural uses or as implants. Examples include catheters (e.g., renal or vascular catheters such as balloon catheters), guide wires, balloons, filters (e.g., vena cava filters, distal protection filters, etc.), stents (including coronary artery stents, peripheral vascular stents such as cerebral stents, urethral stents, ureteral stents, biliary stents, tracheal stents, gastrointestinal stents and esophageal stents), stent grafts, vascular grafts, vascular access ports, embolization devices including cerebral aneurysm filler coils (including Guglilmi detachable coils and metal coils), myocardial plugs, pacemaker leads, left ventricular assist hearts and pumps, total artificial hearts, heart valves, vascular valves, tissue bulking devices, tissue engineering scaffolds for cartilage, bone, skin and other in vivo tissue regeneration, sutures, suture anchors, anastomosis clips and rings, tissue staples and ligating clips at surgical sites, cannulae, metal wire ligatures, orthopedic prosthesis such as bone grafts, bone plates, joint prostheses, as well as various other medical devices that are adapted for implantation or insertion into the body.

The medical devices of the present invention include implantable and insertable medical devices that are used for systemic treatment, as well as those that are used for localized treatment, including treatment of any mammalian tissue or organ. Non-limiting examples are tumors; organs including the heart, coronary and peripheral vascular system (referred to overall as "the vasculature"), the urogenital system, including kidneys, bladder, urethra, ureters, prostate, vagina, uterus and ovaries, eyes, lungs, trachea, esophagus, intestines, stomach, brain, liver and pancreas, skeletal muscle, smooth muscle, breast, dermal tissue, cartilage, tooth and bone.

As used herein, "treatment" refers to the prevention of a disease or condition, the reduction or elimination of symptoms associated with a disease or condition, or the substantial or complete elimination of a disease or condition. Preferred subjects (also referred to as "patients") are vertebrate subjects, more preferably mammalian subjects and more preferably human subjects. Specific examples of medical devices for use in conjunction with the present invention include vascular stents, such as coronary stents and cerebral stents, which may deliver a therapeutic agent into the vasculature for the treatment of restenosis.

In some embodiments, the medical devices of the invention include polymeric regions that include one or more of the alloys of the invention. In some embodiment the polymeric regions of the medical devices the invention correspond to an entire medical device. In other embodiments, the polymeric regions correspond to one or more portions of a medical device. For instance, the polymeric regions can be in the form of a component of a medical device, in the form of one or more fibers which are incorporated into a medical device, in the form of one or more polymeric layers formed over all or only a portion of an underlying medical device substrate, and so forth. Layers can be provided over an underlying substrate at a variety of locations, and in a variety of shapes (e.g., in desired patterns, for instance, using appropriate masking techniques, such as lithographic techniques). Materials for use as underlying medical device substrates include ceramic, metallic and polymeric substrates. The substrate material can also be a carbon- or silicon-based material, among others. As used herein a "layer" of a given material is a region of that material whose thickness is small compared to both its length and width. As used herein a layer need not be planar, for example, taking on the contours of an underlying substrate. Layers can be discontinuous (e.g., patterned). Terms such as "film," "layer" and "coating" may be used interchangeably herein. As used herein, a "polymeric region" is a region that contains one or more of the alloys described herein, and is typically 50 wt % to 75 wt % to 90 wt % to 95 wt % alloy or more, to even 100 wt % alloy.

Figure 1A:
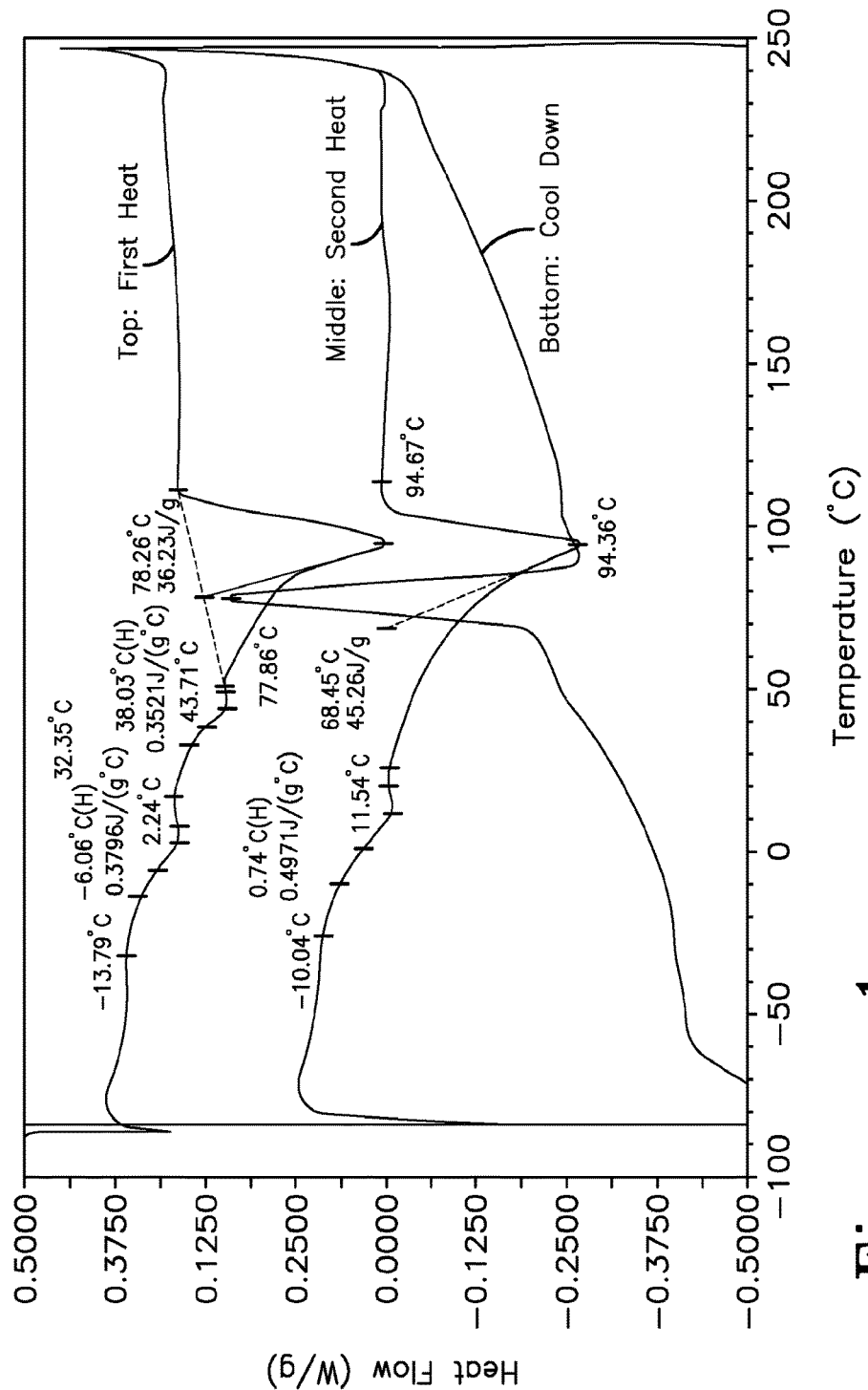
FIG. 1: DSC measurement.

f) additional backscatter image at 10,000 kx.

FIG. 4 TPU A/Nucrel—60/40. Cryo-fractured surface, vapor stained with Ruthenium; backscatter mode; magnifications at a) 2500x, b) 5000 kx, c) 10,000 kx, and d) 15,000 kx.

EXAMPLES

Example 1

TPU Formation

TPU A is prepared by reactive extrusion. An aromatic diisocyanate, a 2000 molecular weight hydroxyl terminated polyether polyol, and a short chain glycol chain extender, are reacted in an extruder. A conventional additive package is also added to the extruder. The components are charged such that the chain extender to polyol molar ratio is about 1.5, the blend molecular weight is about 850, and the hard segment content of the resulting TPU is about 27.5%. TPU B is prepared by reactive extrusion and uses the same aromatic diisocyanate, hydroxyl terminated polyether polyol, and a short chain glycol chain extender as TPU A, except that the polyol is a 1000 molecular weight polyol. A conventional additive package is also added to the extruder. The components are charged such that the chain extender to polyol molar ratio is about 1.2, the blend molecular weight is about 495, and the hard segment content of the resulting TPU is about 40%.

TPU C is prepared by reactive extrusion and uses the same aromatic diisocyanate, hydroxyl terminated polyether polyol, and a short chain glycol chain extender as TPU A. A conventional additive package is also added to the extruder. The components are charged such that the chain extender to polyol molar ratio is about 1.2, the blend molecular weight is about 950, and the hard segment content of the resulting TPU is about 25%.

TPU D is commercially available from BASF under the product name Elastollan® 1180A. TPU D is believed to be a polyether TPU made using 1000 Mn PolyTHF and having about 37% hard segment.

TPU E is commercially available from BASF under the product name Elastollan® 1160A. TPU E is believed to be a polyether TPU based on 1400 Mn PolyTHF having about 29% hard segment and about 15% plasticizer (acetyltributyl citrate).

TPU F is commercially available from BASF under the product name Elastollan® 1175A.

TPU G is commercially available from Bayer under the product name Desmopan® 3360A.

TPU H is commercially available from Bayer under the product name Desmopan® 9370A.

Example 2

PO Formation

Nucrel® 3990 is a copolymer of ethylene and acrylic acid with an acrylic acid content of 9 w/w % commercially available from DuPont also referred to as "Nucrel" below.

Escor™ 5000 and Escor™ 5100 are copolymers of ethylene and acrylic acid with an acrylic acid content of 6 w/w % and 11 w/w % respective commercially available from by ExxonMobil.

Flexirene® MS 40 A is a linear medium density polyethylene (LMDPE) commercially available from by Polimeri Europa.

Nucrel 0903HC is an ethylene-methacrylic acid copolymer resin, made with nominally 9.0 wt % methacrylic acid and supplied by DuPont.

Luca A3110M medium/high density polyethelene copolymer with 4% acrylic acid and 8% butyl acrylate and is supplied by LyondellBasell.

Example 3

Alloy Formation

This experiment describes the preparation of a blended composition in accordance with the present invention. Compositions were made containing either a sole ingredient of one of the invention blend components or a 60/40 w/w combination thereof.

The individual components were fed into a 16 mm co-rotating twin screw extruder with a 40:1 L/D ratio. The screw configuration contained a plasticizing zone and 3 mixing zones made from kneading elements. During compounding the screws ran with a speed of 200 rpm and with the following temperature profile:

| °C. | Die | Zone 8 | Zone 7 | Zone 6 | Zone 5 | Zone 4 | Zone 3 | Zone 2 | Zone 1 | Feed |
|---|---|---|---|---|---|---|---|---|---|---|
| Setting | 170 | 170 | 180 | 180 | 180 | 180 | 185 | 185 | 0 | 0 |
| Actual | 170 | 170 | 180 | 180 | 179 | 180 | 184 | 184 | 122 | 83 |

The polymer melts were extruded through a slit die of 1×45 mm and cooled down on chill rollers (temperature 10° C.).

The thermoplastic polyurethanes were dried prior to compounding accordingly to the recommendations stated by the manufactures. A HELIOS dry-air dryer was used. The polyolefin and polyolefin copolymers were not dried before compounding.

The experiments below describe the preparation of further blended compositions in accordance with the present invention.

BLEND 2 is a 25/75 w/w blend of TPU A and Nucrel 3990, a copolymer of ethylene and acrylic acid.

BLEND 3 is a 50/50 w/w blend of TPU A and Nucrel 3990, a copolymer of ethylene and acrylic acid.

BLEND 4 is a 75/25 w/w blend of TPU A and Nucrel 3990, a copolymer of ethylene and acrylic acid.

For BLEND 2, BLEND 3, and BLEND 4, for each run the individual components are fed into a 30 mm diameter WP ZSK30 co-rotating twin screw extruder with a 29:1 L/D ratio. The screw configuration contains a plasticizing zone and 4 mixing zones made from kneading elements. During compounding the screws are run to the same torque level, here 40%+/−3%, at rates of 12 and 20 pounds per hour (5.4 kg/hr and 9.0 kg/hr). Runs for each blend are completed using the following temperature profiles, where samples are collected under each temperature profile once the process had stabilized.

Temperature Profile for BLEND 2

| | Zone | | | |
|---|---|---|---|---|
| 1 | 2 | 3 | 4 | Die |
| Setting 185° C. | 185° C. | 179° C. | 171° C. | 171° C. |

Temperature Profile for BLEND 3 (−15° C.)

| | Zone | | | |
|---|---|---|---|---|
| 1 | 2 | 3 | 4 | Die |
| Setting 170° C. | 170° C. | 164° C. | 156° C. | 156° C. |

Temperature Profile for BLEND 4 (+15° C.)

| | Zone | | | |
|---|---|---|---|---|
| 1 | 2 | 3 | 4 | Die |
| Setting 200° C. | 200° C. | 194° C. | 186° C. | 186° C. |

The polymer melts were extruded through a two-hole strand die onto a cooling belt, and were dried for 24 hours at 82° C. Several samples are also cooled by a chilled water bath. The thermoplastic polyurethanes were dried prior to compounding according to the manufacturer recommendations. The polyolefins and polyolefins copolymers were not dried before compounding.

The samples were visually compared regarding haze and opaqueness. All samples collected in BLEND 2, BLEND 3, and BLEND 4 showed low haze and opaqueness.

Example 4

Haze of Alloys

In order to evaluate the light-transmitting properties of the blends the haze values were measured using a spectrophotometer and an integrating sphere according to ASTM D1003-07 "Standard Test Method for Haze and Luminous Transmittance of Transparent Plastics". According to the standard materials having a haze value greater than 30% are considered diffusing.

Measurement Conditions

Haze was measured as described in ASTM D1003-07 where a shutter with a reflection standard is moved between the two positions and the haze is calculated as $$\text{haze} = \left(\frac{T_{is}}{T_t} - \frac{T_i}{100}\right) \times 100\%$$

where $T_i$, $T_{is}$ and $T_t$ are in percentage (note that with the instrument normalization the incident light=100%).

Results

The haze was determined for different blends on samples with a thickness of 0.80 mm. at 550 nm—about the center wavelength for visible light.

| Polyurethane | Polyolefin | Composition by weight | Haze at 550 nm |
|---|---|---|---|
| TPU B | — | 100/0 | 16.5 |
| TPU B | Nucrel 3990 | 60/40 | 85.6 |
| TPU B | Escor 5000 | 60/40 | 78.6 |
| TPU B | Escor 5100 | 60/40 | 77.2 |
| TPU B | Flexirene MS40A | 60/40 | 81.2 |
| TPU A | — | 100/0 | 18.2 |
| TPU A | Nucrel 3990 | 60/40 | 29.3 |
| TPU A | Nucrel 0903HC | 60/40 | 20.2 |
| TPU A | Escor 5000 | 60/40 | 30.9 |
| TPU A | Escor 5100 | 60/40 | 31.3 |
| TPU A | Flexirene MS40A | 60/40 | 48.6 |
| TPU A | Lucalen A3110M | 60/40 | 28.3 |
| TPU C | — | 100/0 | 56.0 |
| TPU C | Nucrel 3990 | 60/40 | 47.3 |
| TPU C | Escor 5000 | 60/40 | 46.8 |
| TPU C | Escor 5100 | 60/40 | 47.2 |
| TPU C | Flexirene MS40A | 60/40 | 69.3 |
| TPU D | — | 100/0 | 7.1 |
| TPU D | Escor 5100 | 60/40 | 75.3 |
| TPU E | — | 100/0 | 23.1 |
| TPU E | Escor 5100 | 60/40 | 32.3 |
| TPU F | — | 100/0 | 26.3 |
| TPU F | Escor 5100 | 60/40 | 84.4 |
| — | Nucrel 3990 | 0/100 | 13.7 |
| — | Escor 5000 | 0/100 | 9.0 |
| — | Escor 5100 | 0/100 | 15.1 |
| — | Flexirene MS40A | 0/100 | 63.8 |

TPU B is a transparent and clear material but when it is compounded with polyolefins the blends become white or opaque with a high haze value.

TPU A is also a transparent polyurethane but when it is compounded with polyolefins containing acrylic acid the resulting blends are surprisingly a lot more clear and transparent in comparison with the identical blends with TPU B.

When compounded with Flexirene MS40A, LMDPE the blend is opaque. The pure Flexirene is a white crystalline material so to obtain a transparent blend the pristine materials need at least to be clear from the beginning.

TPU C is an opaque polyurethane but when compounded with polyolefins containing acrylic acid the resulting blends are less opaque than the pristine TPU C and less hazy that the identical blends of TPU B. Even the blend containing Flexirene has a lower haze value than the same bend of TPU B.

From the haze measurements it can be seen that TPU A and TPU C results in blends with lower haze values than TPU B when compounded with polyolefins. Especially TPU A blended with polyolefins containing acrylic acid gives transparent materials.

Example 5

Elongation of Alloys

We tested the alloys of TPU A with varying content of Nucrel 3990 (referred to as "Nucrel" below) at the following TPU/Nucrel ratios; 25/75, 40/60, 50/50, 60/40, and 75/25. These formulations were tested for hardness (ASTM D2240), thermal properties (modulated DSC, ASTM D3418) and mechanical properties (ASTM D412).

Figure 2:
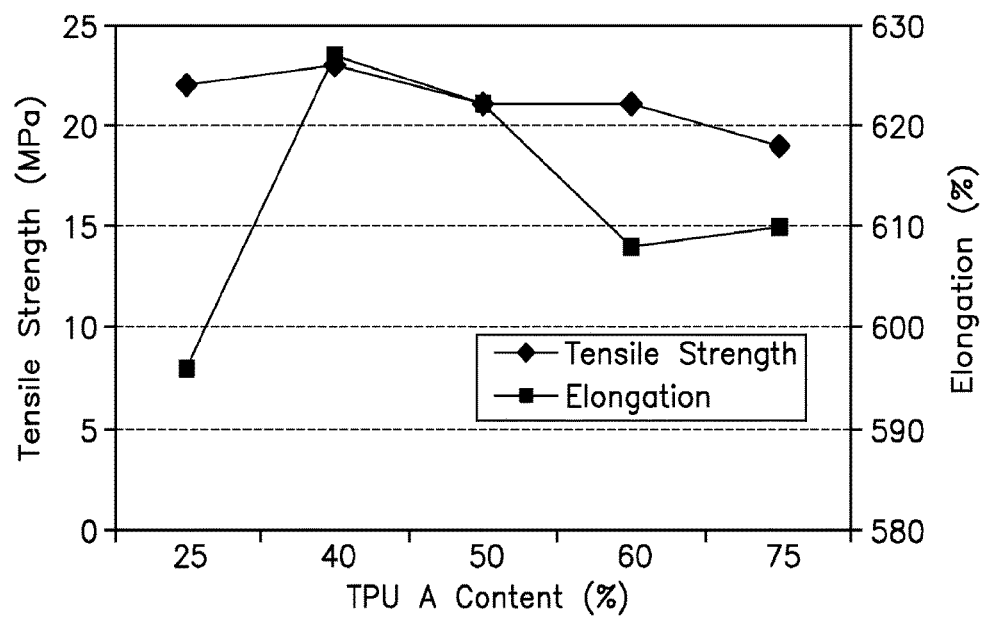
FIG. 2: Tensile strength and elongation as a function of PU/PO ratio.
Figure 3A:
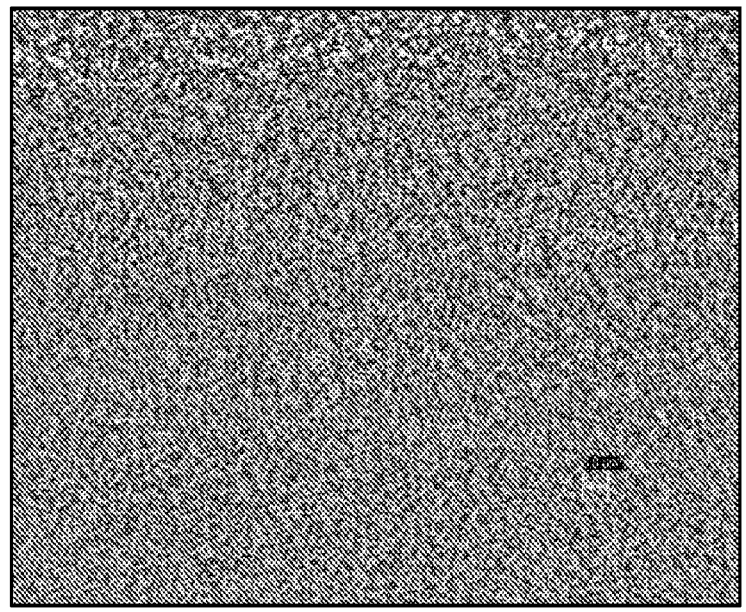
FIG. 3: TPU A/Nucrel—40/60. Cryo fractured surface, vapor stained with Ruthenium; backscatter mode; magnifications: a) 2500x, b) 5000 kx, c) 10,000 kx, and d) 15,000 kx.
Figure 3B:
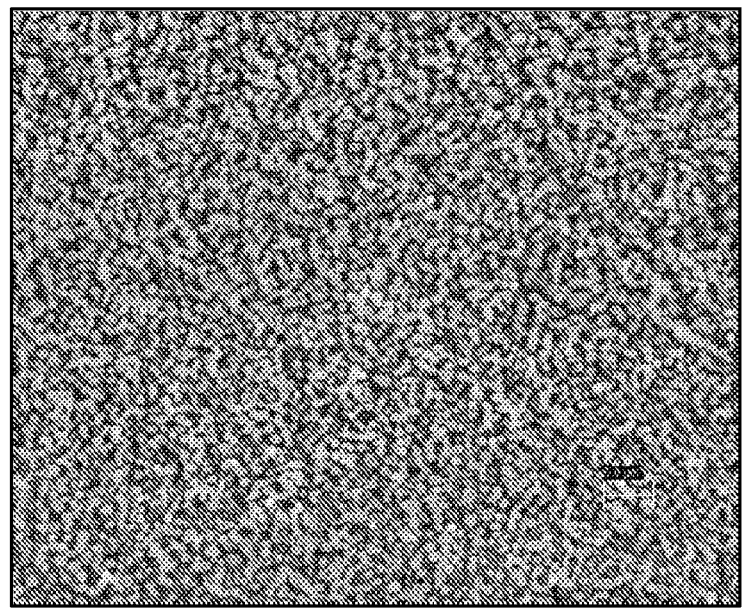
Figure 3C:
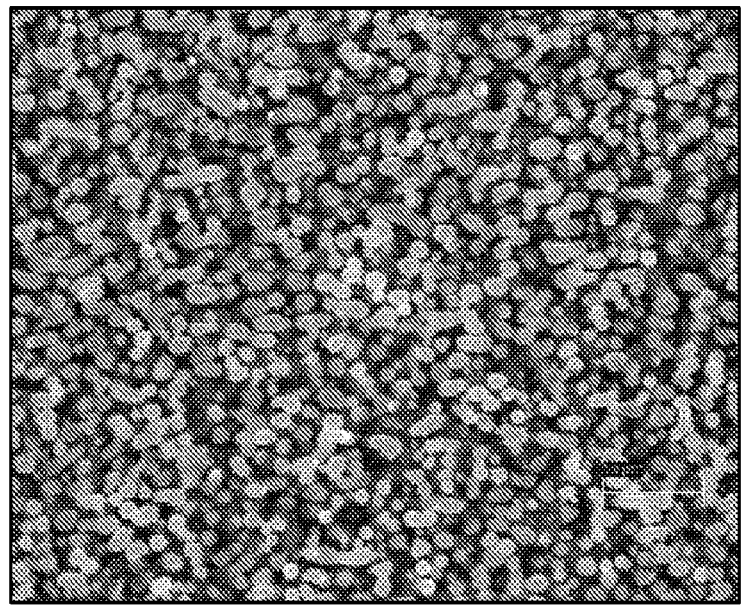
Figure 3D:
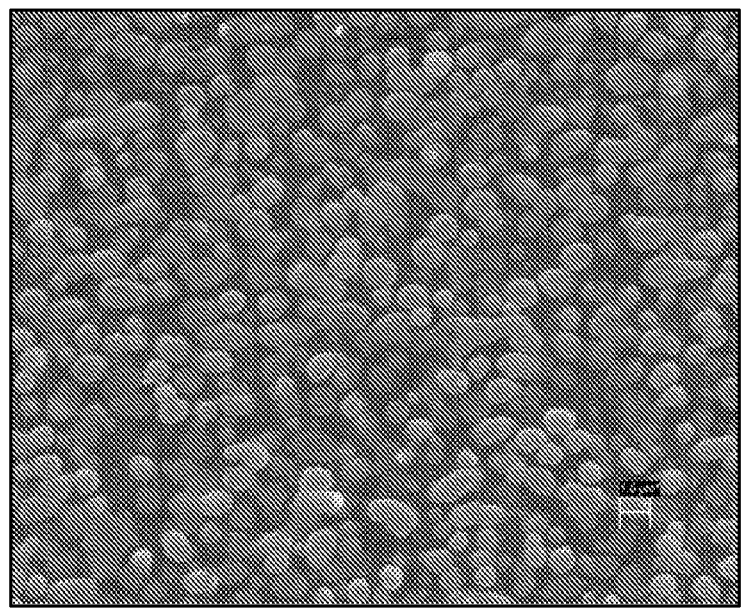
Figure 3F:
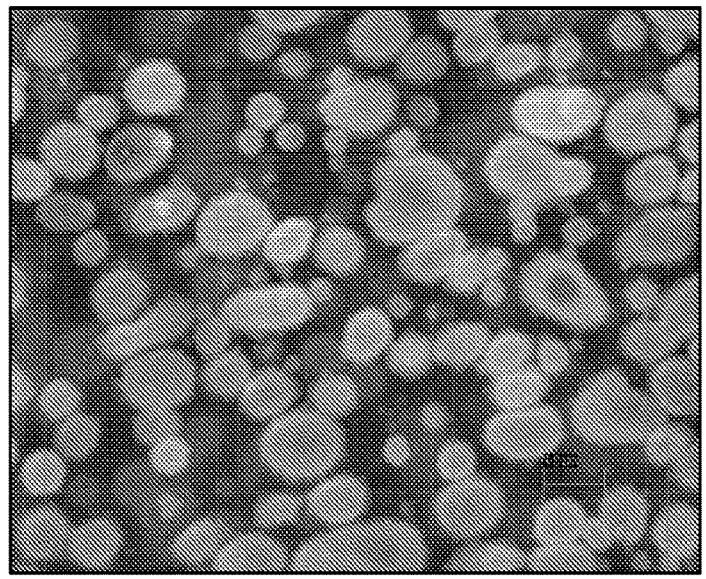
Figure 4A:
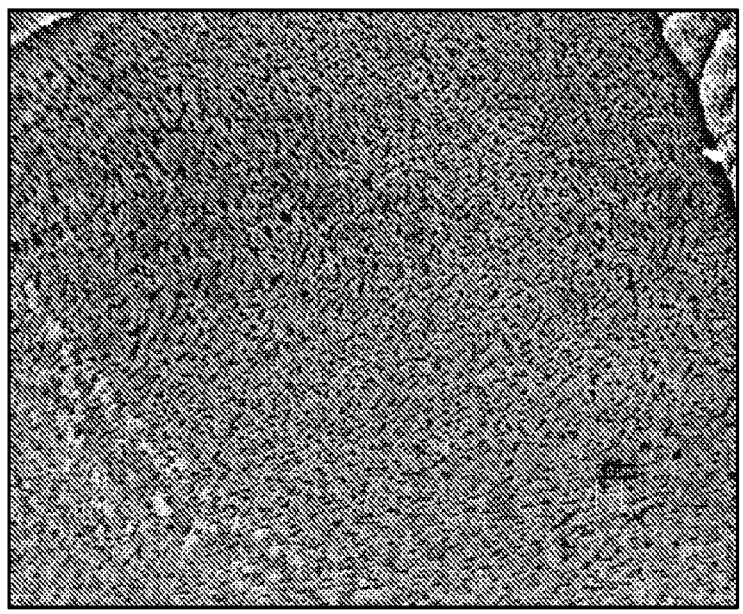
Figure 4B:
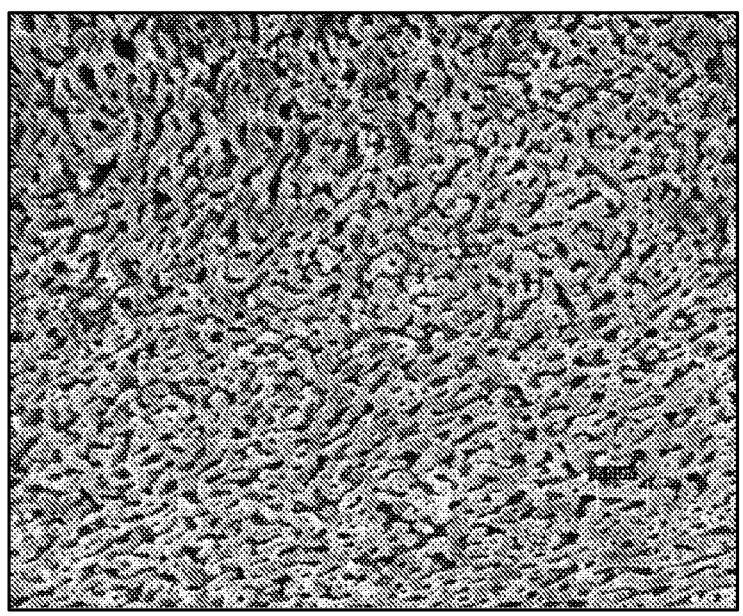
Figure 4C:
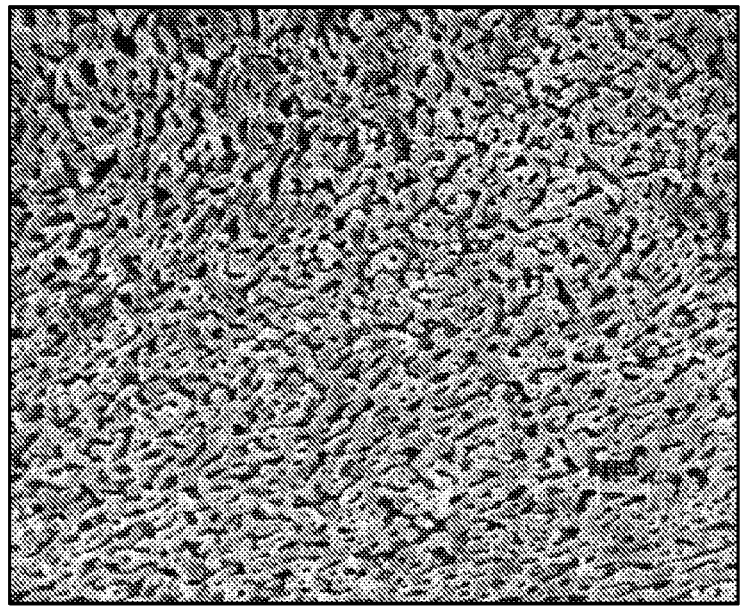
Figure 4D:
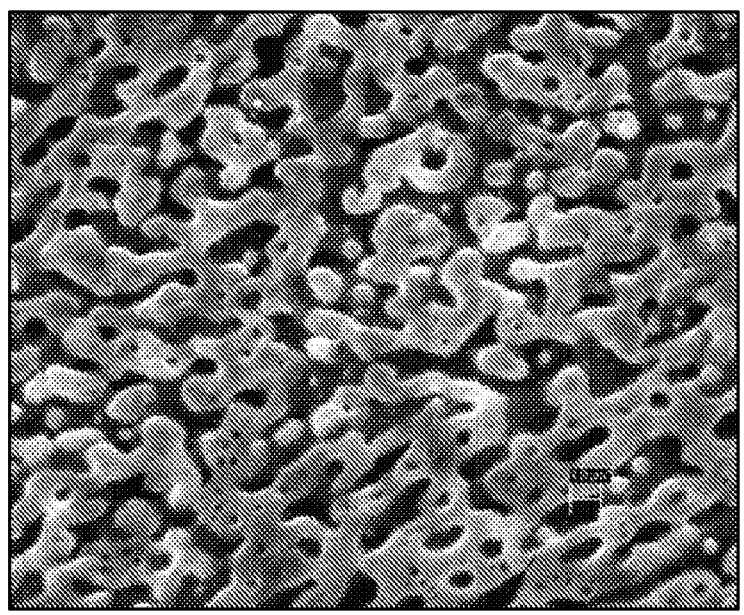

As shown in FIG. 2 the mechanical properties remain within a very narrow range independent of the alloy composition. That allows for alloys with high TPU content to obtain improved olefin compatibility, and high abrasion resistance and alloys with low TPU content to obtain blends with significantly reduced materials costs (as TPU is a significantly more expensive material compared to a PO) and hydrophobic low density while maintaining acceptable physical properties. This is an interesting an unexpected observation. While not wishing to be bound by theory, we believe these mechanical data along with transparency results suggest that a quite stable interface is being formed independent of the composition of TPU A/Nucrel alloy such that the two phases do not macro-phase separate in contrast to what one would generally expect considering the thermodynamic incompatibility of these materials. Furthermore, this stable and potentially broad interface (or interphase) present in the compositions of the invention, and as demonstrated by the data herein, is very effective in stress transfer when the alloy is strained. As one might expect, the hardness values for the alloys are in between the hardness values of each component (i.e. virgin TPU A and virgin Nucrel) but the other physical properties are no so adjusted. In this way, when considering the hardness and mechanical values, these alloys behave like two compatible polymers.

| TPU A Content* | Nucrel 3990 Content* | ASTM D2240** Hardness (Sh. A) | ASTM D412** Tensile Str | ASTM D412** Elongation |
|---|---|---|---|---|
| 0 | 100 | 97 | 24 | 550 |
| 25 | 75 | 94 | 22 | 596 |
| 40 | 60 | 91 | 23 | 627 |
| 50 | 50 | 89 | 21 | 622 |
| 60 | 40 | 84 | 21 | 608 |
| 75 | 25 | 79 | 19 | 610 |
| 100 | 0 | 75 | 27 | 765 |

*Content values are weight percent values.
**ASTM test results are each averages of five test results.

Example 6

DSC of Alloys

Figure 1B:
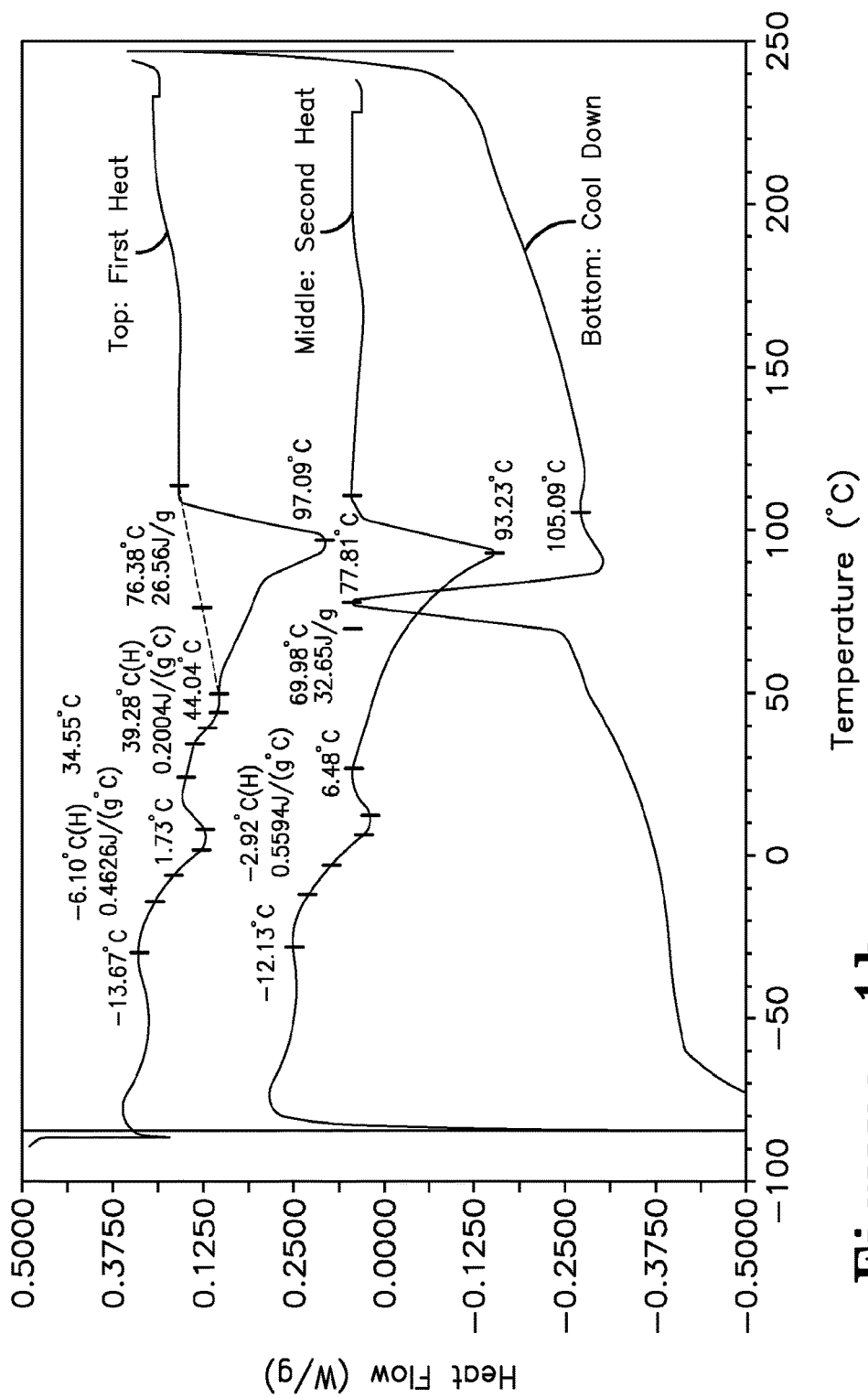

We ran a thermal analysis (modulated DSC, ASTM D3418) of the alloys of our invention. In an illustrative example, we took the TPU A/Nucrel 40/60 sample (FIG. 1). In the modulated DSC measurements a sinusoidal heat profile is applied on top of a conventional linear heat flow. This way the total heat flow is separated into two parts, namely reversing heat flow and non-reversing heat flow. The reversing heat flow is the heat capacity (or thermodynamic) component and non-reversing heat flow is the kinetic component of the total heat flow. Thus the thermodynamic or heat capacity dependent transitions such as glass transition are separated from kinetic transitions such as enhtalpic relaxation.

FIG. 1 shows reversing first heat, second heat and cooling curves, the first heat curve consists of a plethora of interfaces as illustrated by the two glass-transitions (Tg): one at 2.4° C., one at 43.7° C. These two are between the Tg of TPU A and the Nucrel 3990 (the Tg of virgin TPU A is −64° C., virgin Nucrel has a very broad glass transition starting from −7° C. ending around 57.5° C.).

Interestingly, as shown in FIG. 1, in the second heat curve we only find one Tg in-between the two previous Tg's. While not wishing to be bound by theory, this suggests that there are essentially two phases in the composition; a TPU-rich phase and a Nucrel-rich phase. In the first heating cycle the material is heated up to 250° C. where everything is molten and very mobile and then it is cooled down to −90° C. and heated back up again. During the second heating one Tg is observed suggesting one-phase (or interphase) or phase-mixed morphology. However, since these materials are not covalently bonded (this is proved by NMR and solvent extraction studies) each phase tries to separate with time to form a morphology which is observed during the first heating cycle. But since no deterioration in the physical properties or transparency of the material with time was observed, we believe the sample micro-phase (not macro-phase) separates. This is again is believed to be due to presence of a stable interface.

Furthermore, the presence of two Tg and micro-phase separated morphology suggests that the material acts like a segmented copolymer (i.e copolyester, polyurethane, polyuria, copolyetheramide, etc. . . . ) where two incompatible phases are covalently bonded even though the sample is only a melt blend.

Example 7

SEM of Alloys

The samples were cryo-fractured and stained before running with SEM. Both backscattered electron (FIG. 3 and FIG. 4) and secondary electron images are obtained. SEM pictures of 40/60 (TPU A/Nucrel) show narrow distribution of TPU droplets in the Nucrel phase (40/60). On the other hand the SEM image of 60/40 (TPU A/Nucrel) shows development of a co-continuous morphology similar to microphase separated segmented copolymer.

Example 8

Viscosity of Alloys

The apparent viscosities of all the virgin materials and TPU A/Nucrel alloys were determined using capillary rheometer (Goettfert Rheotester 2000, with capillary die of 1 mm and L/D ratio of 30) the samples were run at three temperatures; 170, 180, and 190 C which cover the temperature range used during compounding. The apparent viscosity values and ratios at 100 1/s, 1000 1/s, and 3000 1/s shear rates at each temperature are listed in the attached table.

| Shear Rate (1/s) | TPU A | TPU B | TPU C | TPU D | TPU E | Nucrel |
|---|---|---|---|---|---|---|
| App. Vis. (Poise) at 170 C. | | | | | | |
| 100 | 40000 | 40000 | 27000 | 40000 | 13000 | 5700 |
| 1000 | 7500 | 9000 | 6000 | 9000 | 3800 | 1800 |
| 3000 | 3400 | | 2700 | | 1800 | 970 |
| Nucrel/TPU | 0.29 | | 0.36 | | 0.54 | 1.00 |
| TPU/Nucrel | 3.51 | 0.00 | 2.78 | 0.00 | 1.86 | 1.00 |
| App. Vis. (Poise) at 180 C. | | | | | | |
| 100 | 21000 | 23000 | 15000 | 29000 | 9000 | 5000 |
| 1000 | 5800 | 6400 | 4700 | 8000 | 3000 | 1700 |

-continued

| Shear Rate (1/s) | TPU A | TPU B | TPU C | TPU D | TPU E | Nucrel |
|---|---|---|---|---|---|---|
| 3000 | 2600 | 3000 | 2000 | 3000 | 1300 | 880 |
| Nucrel/TPU | 0.34 | 0.29 | 0.44 | 0.29 | 0.68 | 1.00 |
| TPU/Nucrel | 2.95 | 3.41 | 2.27 | 3.41 | 1.48 | 1.00 |
| App. Vis. (Poise) at 190 C. | | | | | | |
| 100 | 12000 | 16000 | 9000 | 18000 | 5000 | 3800 |
| 1000 | 4000 | 4900 | 3400 | 5500 | 2300 | 1400 |
| 3000 | 2000 | 2200 | 1700 | 3700 | 1200 | 750 |
| Nucrel/TPU | 0.38 | 0.34 | 0.44 | 0.20 | 0.63 | 1.00 |
| TPU/Nucrel | 2.67 | 2.93 | 2.27 | 4.93 | 1.60 | 1.00 |

Example 9

Determination of Refractive Index

| | Refractive Index |
|---|---|
| Nucrel | 1.4930 |
| TPU A | 1.5039 |
| TPU B | 1.5326 |
| TPU C | 1.5048 |
| TPU D | 1.5321 |
| TPU E | 1.5046 |

The samples were prepared and analyzed in accordance with ASTM D-542-95. A circular cross section, one from each pellet, was used. The samples were either egg-shaped or rod-like pellets. A single section, perpendicular to the longest length of the pellet, was excised with a microtome blade and used as an individual measurement of refractive index. Thus each refractive index measurement represents a different pellet. Readings were only obtained if the small pellet cross section was nearly centered on the Refractometer prism. At least five specimens, one each per pellet, were tested. Average deviation with 5 specimens was small. Otherwise more pellets could have been used. Specimens were cut with a microtome blade from each pellet. Measurements were taken at (25.0+/−0.1) degrees Celsius using an ATAGO Abbe Type 3T Refractometer held at temperature using a constant temperature bath. Prior to sample analysis the instrument was checked for accuracy using a polished glass standard at 25° C. (1.5162). Five measurements of the specimens were made using sodium D rays (589.3 nm wavelength). With the glass standard a small amount of 1-bromonaphthalene (refractive index=1.64) was used on the specimen to wet the interface between the sample and the prism of the instrument.

Both TPU B and TPU D have indices at 1.5321 and 1.5326, which are very different from Nucrel 3990, which has a refractive index of 1.4930. This can explain why they form opaque blends.

Example 10

Surface Tension of Components Relative to Physical Properties of Alloys

The surface tension (ST) of various components, along with each component's refractive index (RI) were collected and compared to the physical properties of alloys made from various combinations of the components, including the haze seen in each alloy at 550 nm. The surface tension of the components was measured by an analysis described in the following journal article: N.J. Alvarez, L. M. Walker, and S. L. Anna, A non-gradient based algorithm for the determination of surface tension from a pendant drop: application to low Bond number drop shapes., Journal of colloid and interface science, vol. 333, no. 2, pp. 557-62, 2009, incorporated herein by reference. The refractive index of the component was measured as described above in Example 9. The difference or delta (Δ) in the surface tension and refractive index of the components of each alloy are also calculated. In the table below PO A is Nucrel 3990 and PO B is Escor 5100. The results are presented in the table below:

| | | | Alloy Composition | | | | | | |
|---|---|---|---|---|---|---|---|---|---|
| | TPU Component | | PO Component | | | TPU:PO wt | Δ | | |
| Ex. No. | TPU ID | ST | RI | ID | ST | RI | ratio | ST | Δ RI | Haze |
| 10-1 | TPU B | 29.3 | 1.5326 | PO A | 21.8 | 1.4930 | 60:40 | 7.5 | 0.0396 | 85.6 |
| 10-2 | TPU B | 29.3 | 1.5326 | PO B | 18.1 | 1.4987 | 60:40 | 11.2 | 0.0339 | 77.2 |
| 10-3 | TPU A | 19.8 | 1.5039 | PO A | 21.8 | 1.4930 | 60:40 | 2.0 | 0.0109 | 29.3 |
| 10-4 | TPU A | 19.8 | 1.5039 | PO B | 18.1 | 1.4987 | 60:40 | 1.7 | 0.0052 | 31.3 |
| 10-5 | TPU E | 27.3 | 1.5049 | PO B | 18.1 | 1.4987 | 60:40 | 9.2 | 0.0062 | 32.3 |
| 10-6 | TPU D | 29.5 | 1.5321 | PO B | 18.1 | 1.4987 | 60:40 | 11.4 | 0.0334 | 75.3 |
| 10-7 | TPU G | 27.6 | 1.5102 | PO B | 18.1 | 1.4987 | 60:40 | 9.5 | 0.0115 | 51.2 |
| 10-8 | TPU H | — | 1.5082 | PO B | 18.1 | 1.4987 | 60:40 | — | 0.0095 | 26.5 |

As the data shows, alloys where the components have more comparable surface tensions, and especially when they also have more comparable refractive index results, as demonstrated by smaller delta values, the resulting alloy is less hazy. Example 10-3 and Example 10-1 clearly show this, were smaller delta ST and delta RI values correspond to Example 10-3's lower haze value.

Each of the documents referred to above is incorporated herein by reference. Except in the Examples, or where otherwise indicated, all numerical quantities in this description specifying amounts, reaction conditions, molecular weights, number of carbon atoms, etc., are to be understood as modified by the word "about." Unless otherwise indicated, all percent and formulation values are on a molar basis. Unless otherwise indicated, all molecular weights are number average molecular weights. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. All of the embodiments of the invention described herein are contemplated from and may be read from both an open-ended and inclusive view (i.e. using "comprising of" language) and a closed and exclusive view (i.e. using "consisting of" language). As used herein parentheses are used designate 1) that the something is optionally present such that monomer(s) means monomer or monomers or (meth) acrylate means methacrylate or acrylate, 2) to qualify or further define a previously mentioned term, or 3) to list narrower embodiments.

The invention claimed is:

1. An alloy consisting of a thermoplastic polyurethane (TPU), a polyolefin (PO), optionally a plasticizer and optionally an additive, wherein:
    the optional plasticizer, when present, consists of phthalate based plasticizers, aliphatic ester based plasticizers, pyrometallitate-based plasticizers, phosphate-based plasticizers, epoxy-based plasticizers, polyester based polymer plasticizers, or any combination thereof;
    the optional additive, when present, consists of pigments, UV stabilizers, UV absorbers, antioxidants, lubricity agents, heat stabilizers, hydrolysis stabilizers, flame retardants, layered silicates, colorants, reinforcing agents, adhesion mediators, antimicrobial agents, or any combination thereof; and
    the PO contains at least one functional group that can form long range interactions with one or more segments of the TPU, wherein the at least one functional group is acrylic acid, and wherein the PO is a copolymer of polyethylene and acrylic acid, wherein the PO copolymer comprises at least 11% acrylic acid by weight.

2. An alloy according to claim 1, wherein a ratio between a refractive index of the TPU and a refractive index of the PO at room temperature is between 0.8 and 1.2.

3. An alloy according to claim 1, wherein the TPU has a haze below 30 and the PO has a haze below 30.

4. The alloy according to claim 1, wherein the alloy comprises 30-70 (w/w) % TPU.

5. The alloy according to claim 1, wherein the alloy comprises 30-70 (w/w) % polyolefin.

6. The alloy according to claim 1, wherein the phthalate based plasticizer comprises di-n-butylphthalate, di-2-ethylhexyl phthalate (DOP), di-n-octyl phthalate, diisodecyl phthalate, diisooethyl phthalate, octyldecyl phthalate, butylbenzyl phthalate, di-2-ethyhexyl phosphate isophthalate and mixtures thereof.

7. The alloy according to claim 1, wherein the aliphatic ester based plasticizer comprises di-2-ethylhexyl adipate (DOA), di-n-decyl adipate, diisodecyl adipate, dibutyl sebacate, di-2-ethylhexyl sebacate and mixtures thereof.

8. The alloy according to claim 1, wherein the pyrometallitate-based plasticizer comprises trioctyl trimellitate, tridecyl trimellitate and mixtures thereof.

9. The alloy according to claim 1, wherein the phosphate bases plasticizer comprises tributyl phosphate, tri-2-ethylhexyl phosphate, 2-ethylhexyldiphenyl phosphate, trieresyl phosphate and mixtures thereof.

10. The alloy according to claim 1, wherein the epoxy-based plasticizer comprises an epoxy-based soybean oil.

11. The alloy according to claim 1, wherein the plasticizer is di-isononylcyclohexane-1,2-dicarboxylate.

12. The alloy according to claim 1, wherein the additive is a UV stabilizer.

13. The alloy according to claim 1, wherein the additive is a UV absorber.

14. The alloy according to claim 1, wherein the additive is an antioxidant.

15. The alloy according to claim 1, wherein the additive is an antimicrobial agent.

* * * * *